United States Patent [19]

McCarthy

[11] Patent Number: 5,801,964
[45] Date of Patent: Sep. 1, 1998

[54] ELECTRONIC MONITORING APPARATUS FOR CYCLIC MACHINES

[76] Inventor: Harold McCarthy, 6 Prospect St., New Milford, Conn. 06776

[21] Appl. No.: 780,512

[22] Filed: Jan. 8, 1997

[51] Int. Cl.[6] .................................................. G01B 17/00
[52] U.S. Cl. ................................ 364/551.02; 364/551.01
[58] Field of Search ................................ 364/55.02, 130, 364/140, 146, 468.01, 468.15, 475.09, 550, 551.01, 552, 554

[56] References Cited

U.S. PATENT DOCUMENTS

| | | | |
|---|---|---|---|
| 5,077,582 | 12/1991 | Kravette et al. | 355/206 |
| 5,241,482 | 8/1993 | Iida et al. | 364/468 |
| 5,284,164 | 2/1994 | Andrews et al. | 131/280 |
| 5,446,672 | 8/1995 | Boldys | 364/474.16 |

*Primary Examiner*—Hezron E. Williams
*Assistant Examiner*—Patrick Assouad

[57] ABSTRACT

An electronic monitor for cyclic machines senses an electrical signal at the beginning or end of each cycle of operation of a machine, using a sensor such as a momentary-contact electrical switch or a proximity sensor, counts the time elapsed between such signals corresponding to a complete cycle of the machine and utilizes that time, via a microprocessor, and preset signals representative of various known or desired machine conditions, such as the number of pieces produced/completed during each machine cycle, the number of pieces desired to be produced, and the like, and based upon calculations that are pre-programmed into an internal microprocessor, generates a visual and/or audible display of selected desired information such as: actual elapsed machine running time since the start of the current cycle, the actual number of pieces produced since the start of a current operation, the number of pieces remaining to be produced during the current operation, the time required to produce the number of pieces not yet produced, and related information of the type that should be known for appropriate control of machine operations.

6 Claims, 2 Drawing Sheets

ELECTRONIC MONITORING APPARATUS FOR CYCLIC MACHINES

BACKGROUND OF THE INVENTION

This invention relates generally to electronic monitoring apparatus for cyclic manufacturing machines, and more specifically relates to electronic monitoring apparatus that allows an operator to enter information concerning the number of pieces to be manufactured during a particular run of the machine and provides the operator with a display of calculated information based upon combinations of: information entered by the operator, the counted number of operating cycles of the machine and the elapsed time during which those cycles were completed.

Apparatus for monitoring the operation of cyclic machines is well known in the prior art. The prior art apparatus incorporates many different forms of electrical, mechanical and electromechanical equipment to provide information and control related to specific aspects of machine operation. In general, the prior art relies upon displays of information derived solely from the number of machine operations and the elapsed time during which the machine operations occurred. However, the prior art does not appear to provide an electronic monitoring apparatus capable of receiving input instructions from an operator concerning the number of pieces to be produced during a production run of the monitored machine and then displaying calculated information derived from concurrent processing of the operator-provided information and information that is derived from both the counted number of operating cycles of the machine and the monitored operating time of the machine, this is important to assure that the operator of the machine will have readily available, in convenient display form, both directly recorded, and calculated, information that is needed to determine how and when the machine should be attended to achieve desired operating results. In this regard, it is noted that this invention is particularly well adapted to monitor the operation of the type of machine that produces a known or predetermined total number of parts from a given "load" or "charge" of "stock" or "raw material". In such a machine, the "stock" is loaded into the machine in bulk, and the machine is then allowed to run, substantially automatically and unattended in a repetitive cycle process, until as much as possible of the "load" of "stock" has been consumed. In general, the total number of parts produced per overall load is determined in accordance with a known "constant" representing the number of parts produced per unit quantity of the raw material. For example, if a machine is "loaded" with one hundred pounds of a raw material having a known "constant" of one hundred fifty pieces per pound, then the total number of pieces to be produced from that load will be determined, readily, to be fifteen thousand pieces (100 pounds times 150 pieces per pound). It will be understood by those having skill in this art that although this total number is independent of the time required for production, time is, nevertheless, an important consideration in the management and control of such production machinery.

SUMMARY OF THE INVENTION

Accordingly, it is an object of this invention to provide an electronic apparatus for monitoring the operation of a repetitive-cycle manufacturing machine that provides continuously revised calculations based upon a combination of elapsed time, the counted number of machine cycles, and manually entered, preset values that represent desired operating results of the machine.

It is a further object of this invention to provide a monitoring apparatus for a cyclically operating manufacturing machine, that provides continuous displays of the number of pieces scheduled to be made, the number of pieces remaining to be made and the time required to produce the remaining pieces.

It is still another object of this invention to provide a monitoring apparatus for a cyclically operating manufacturing machine, that readily reflects an operator's acceptance or rejection of manufactured parts without requiring manual resetting of the count of parts completed.

These and other and further objects, features and advantages of this invention will be made apparent to those having skill in this art by the following specification, considered with reference to the accompanying drawings, in which:

DETAILED DESCRIPTION OF THE INVENTION

Figure 1:
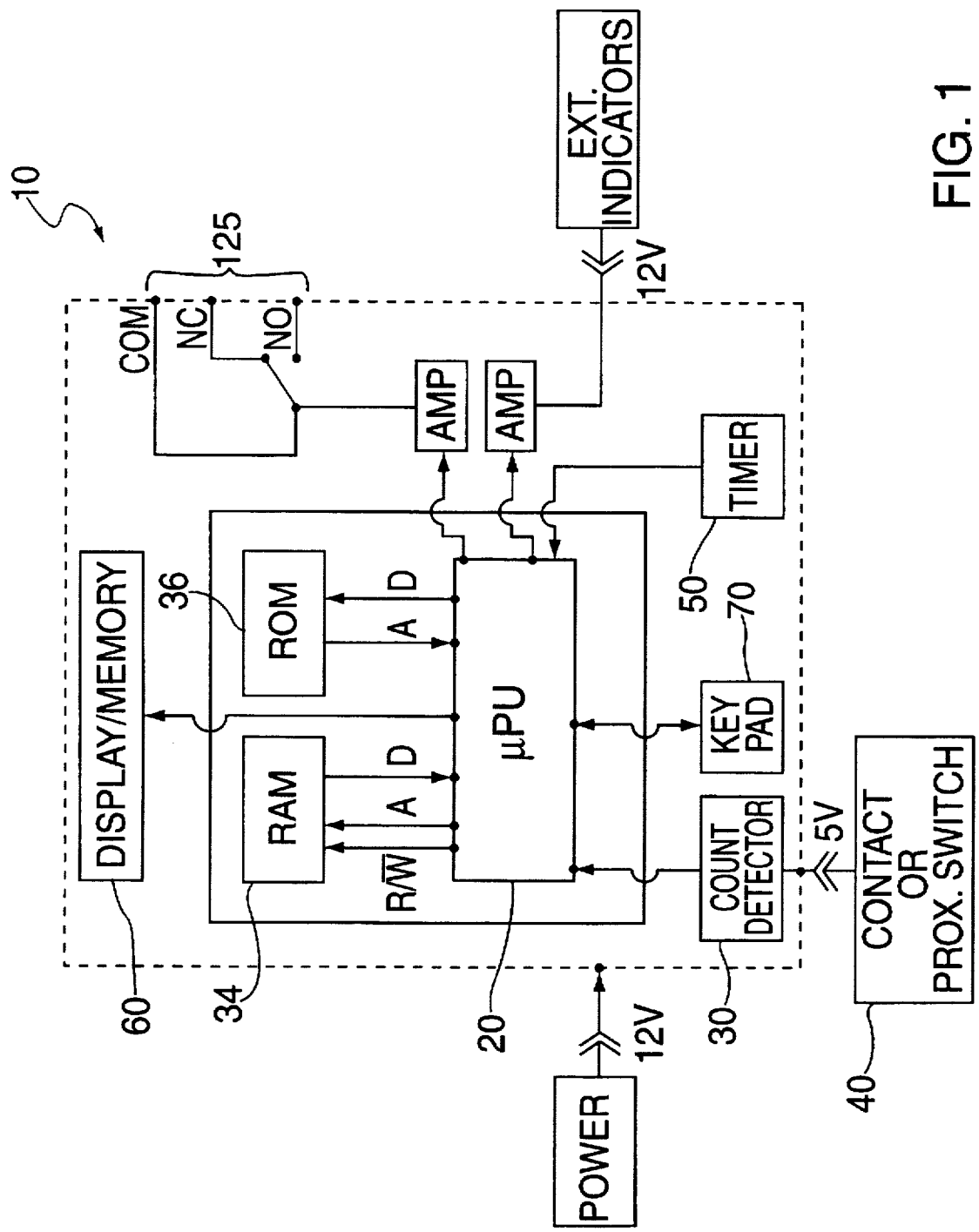
FIG. 1 is a graphic representation of the functional components of an apparatus in accordance with this invention.

Referring now more particularly to the drawings, an electronic monitoring apparatus 10 in accordance with this invention may be seen to comprise a microprocessor 20 having a count detector 30 coupled to a sensor switch 40 of the type attachable to a cyclic machine (not shown) for producing a signal indicative of each cycle of the cyclic machine, and further having a timer 50 coupled to provide continuous unit time signals to the microprocessor 20. A visual display device 60 of any well-known type is coupled to the microprocessor 20 for receiving and displaying alphanumeric character signals representative of machine parameters detected and/or generated, i.e. produced, by the microprocessor 20. Microprocessor 20 also includes a RAM device 34 and a ROM device 36 providing electronic memory functions in association with the microprocessor 20 for purposes further described herein. A key pad 70 constructed in any suitable known manner from known components is coupled to the microprocessor 20, also, so that an operator may enter information into the memory associated with the processor 20 corresponding to values representing desired machine operating results.

Figure 2:
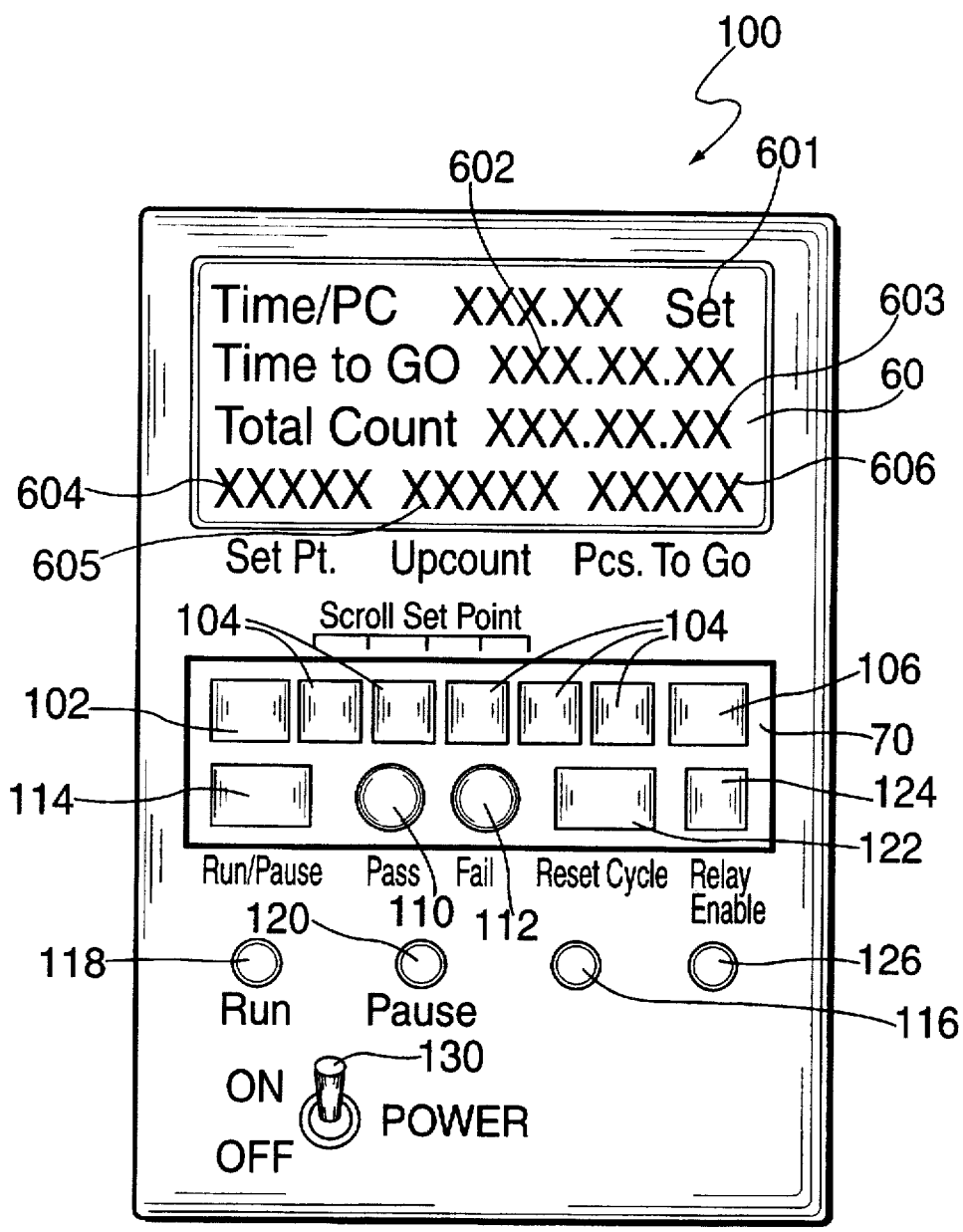
FIG. 2 is a front view of a combined display device and key pad device used in the described embodiment of this invention.

As shown in FIG. 2, display device 60 and keypad 70 may be combined into a single housing 100 which may, if desired, also form a mounting container that supports and encloses count detector 30, RAM 34, and ROM 36 (these elements are not shown in FIG. 2), and timer 50 (not shown in FIG. 2), as well as the necessary electrical power supply devices, not shown, and related electrical connections, not shown, for those elements, to form a compact and convenient-to-use portable unitary structure. Sensor switch 40, which must be coupled to or associated with a manufacturing machine to sense sequential operating cycles of the machine, is preferably, although not necessarily, separate and independent of unitary housing 100.

Sensor switch 40 may be any suitable device such as a proximity switch [not shown] or a simple micro switch [not shown] tripped by a rotating cam [not shown], that operates in a known manner to produce an electrical signal or to interrupt an electrical circuit, once for each cycle of a rotating part. That is, switch 40 need only create a detectable electrical discontinuity once during each cycle of a cyclic machine, preferably at the same point in each cycle of the machine and more preferably, immediately following completion of each such cycle.

Operation of the disclosed apparatus may best be understood by reference to the drawings, as follows. In this description it is understood that those skilled in this art will know the common operating capabilities and requirements of microprocessors, and RAM and ROM devices, including their ability to record and store signals representing numerical and alphanumerical figures, in electronic "memory", and will recognize how these features of microprocessors may be applied in accordance with this invention, using readily available prior art designs and components:

The once-per-cycle signal produced by sensor 40 is supplied to RAM 34 through microprocessor 20, and is stored as three separate and distinct counts in RAM 34. Two of the counts count "up" from zero, increasing the stored count by one unit for each signal received from sensor 40. By contrast, the third count is a "down" counter that decreases its stored count by one unit for each signal received from sensor 40, representing one cycle of the monitored machine. The "down" counter counts down from a preset stored count value that is entered into the memory storage associated with the counter, by means of key pad 70. For the purpose of setting and/or resetting the count in each of the three count storage areas, RAM 34 is coupled to microprocessor 20 in a manner that permits transmission of electrical signals in both directions between the counters and the microprocessor.

An object of this invention is to monitor a cyclic manufacturing machine in a way that allows an operator to determine readily, at any time, how the operation of such a machine compares to a production schedule. In this regard, a production schedule may be understood to refer to the production of a predetermined, known number of production parts. When, as is usually the case, the output of a monitored machine is limited to a finite number of parts that can be produced from a given supply of material, then the "down" counter may be programmed to count down from a preset value representing that finite number. Suitable adjustments can be made in any desired and known manner to reflect the actual number of parts produced during each cycle of the machine, to reflect the fact that it is actual cycles of the machine, not parts produced, that is being "counted".

Overall, sensor switch 40 is associated with a monitored machine to provide once-per-cycle signals to apparatus 10; before the machine is started on a production run, the "down" counter is preset to store a known or predetermined count value, called the "Set Point", representing the total number of parts to be produced from a load of raw material. The setting of these counters is accomplished using keypad device 70 that, in the illustrated embodiment, is incorporated into housing 100.

For operation in the most desirable mode, the setting and resetting of "down" counter 30 is permitted by microprocessor 20 only while the apparatus remains in the "pause" mode; the "pause" mode is entered in one of two ways: (1) manually, by manual activation of the "pause" key 114; or (2) automatically, upon occurrence of "pause" cycle conditions, namely when the "down" counter 30 counts down to zero, thereby indicating that the end of a production run, using a given load of raw material, has been reached. When the apparatus is in "pause" condition, regardless of how the condition is achieved, the count in down counter 30 may be reset in either one of two ways: in one manner, the value in the counter may be reset to any desired number by first activating the "reset cycle" key 122, and then using "scroll" keys 104 to set any desired number as explained herein; following entry of the desired number, actuation of the enter set point key 106 directs the microprocessor to return to normal running operation of the apparatus after the desired number is entered into the down counter memory. In another manner, while the apparatus is in the "pause" mode, actuation of the reset cycle key without otherwise instructing the down counter causes the microprocessor to re-enter into the down counter, from the existing RAM memory, the last recorded "set point" value; this provision of the microprocessor serves two valuable purposes: (i) it assures that the apparatus cannot be activated to control machine operation when the "set point" value is equal to zero, and (ii) it facilitates reactivation of a monitored machine without requiring manual reentry of a known set point when the machine is being run repetitively with identical loads of raw material.

In the operation of down counter 30 in connection with resuming machine monitoring operation from the "pause" mode, the microprocessor directs signals to the storage memory of "down" counter 30 from dedicated scrolling keys 104; there are five such keys, although a greater or lesser number of keys may be provided. Each key 104 corresponds to a given position in a five digit number that is used to represent the total number of parts to be produced from a load of raw material; in the illustrated embodiment, using five such keys, the maximum number that can be entered into the memory or register of the set point display is 99,999. Keys 104 perform a "scrolling" function, in a well known manner, in which each activation of a key advances by one, the "digit" figure at the location that corresponds to the position of the key. When each one of the five digits in the set point memory has been set, the microprocessor is instructed to store the setting in the corresponding memory position, through manual activation of a dedicated "set point enter" key 106. In a related manner, the count in the memory of "total count" counter 34 is reset to zero before the start of a production run of a monitored machine by depressing dedicated "zero total count" key 102. Dedicated "pass" key 110 resets the second of the two "up" counters to zero, when desired. In actual use of the invention, "pass" key 110 and "reject" key 112, both serve to reset the "up" counter to zero; however, there is a significant functional difference between the two keys: specifically, whereas "pass key" 110 serves exclusively to reset the "up" counter to zero, for reasons explained below, "reject" key 112 sets counter 36 to zero and concurrently deducts from the stored count in the first of the two "up" counters, i.e. the "total" counter, the value of the count in the second "up" counter before it is reset. In this regard, it is noted that the "pass" key may be used to reset the second "up" counter to zero to signify the start of a new portion of a production run in which new raw material has been loaded into a monitored machine, or a batch of produced parts has been inspected and found to be acceptable, but the total number of scheduled parts has not yet been completed. By contrast when the "reject" key 112 is activated, the second "up" counter is reset to zero, and the value in the memory storage location of the second "up" counter, before it is reset, is deducted from the stored count in the first "up" counter; this in effect signifies that the number of parts that were stored in the memory of the second "up" counter has not been accepted and will not be included in the "total" count of acceptable parts that is accumulated in the memory of "total" count in the first "up"

counter. To assure against inadvertent activation of the dedicated keys described up to this point, all keys other than pass key 110, "reject" key 112 and run/pause key 114, are routinely disabled by microprocessor 20 while the monitoring apparatus 10 is in its normal "run" mode.

The status of apparatus 10, i.e. in "run" or "pause" mode, is selected by the operator using dedicated "run/pause" key 114. This key "toggles" operation of apparatus 10 between "run" condition, in which all counters are active to record machine cycles as described above, and the "pause" condition in which all three counters are "latched" i.e. are prevented from counting in response to signals from sensor 40. For the convenience of the operator, signal lights 118 and 120 are provided, with connections to microprocessor 20, so as to provide visual confirmation of the "run" or "pause" condition of apparatus 10.

To meet the further objective of this invention for providing an operator with information that will permit informed decision making about continued operation of a machine that is being monitored, microprocessor 20 is programmed in a known manner, to generate a "time to go" signal. The "time to go" signal corresponds to the value of the time required to complete the number of pieces scheduled for production as entered by the operator using the scroll keys 104, at the instantaneous rate of machine operation at any time. The "time to go" value is calculated by microprocessor 20 in a known manner by first determining the time, in ordinary time units, elapsed between the two latest, successive signals from sensor 40; this corresponds to the "time per piece" for a machine manufacturing one piece per machine cycle. Measuring the time per piece time utilizes the signals provided to the microprocessor 20 by electronic timer 50 which may be of any known and suitable design. Next, the microprocessor multiplies the time per piece by the value of the count in the "down" counter, which represents the number of pieces remaining to be produced during the current production run.

The calculated "time to go" value is produced as a suitable signal by microprocessor 20 and is displayed in a known manner by display device 60 incorporated in housing 100. Display device 60 may incorporate light emitting diodes or liquid crystal displays or any suitable form of known display technology, although liquid crystal technology is preferred. As shown in FIG. 2, display device 60 includes means for displaying the following recorded and/or calculated information derived from operation of a monitored machine: (a) "time per piece" 601 [calculated by microprocessor 20 by counting the time from timer 50 elapsed between the last two successive signals from sensor 40]; (b) "time to go" 602 [calculated by microprocessor 20 by multiplying the current "time per piece" signal value by the current "pieces to go" value in the memory of the "down" counter ]; (c) "total count" 603 [the value at any time, of the count stored in the memory of the first "up" counter 34]; (d) "set point" 604 [the value stored in microprocessor 20 under the direction of an operator using "scroll" keys 104, at the beginning of a production run of a monitored machine]; (e) "Up Count" 605 [the number of machine cycles signaled by sensor 40 since the last time counter 36 was reset to zero by an operator using either "pass" key 110 or "reject" key 112]; and (f) "pieces to go" 606 [from the memory of the "down" counter]. Although a particular form of visual display is shown, it will be understood that other forms of display, e.g. synthesized speech, or combinations of synthesized speech and other forms of visual displays, such as, for example, mechanical "flip" cards, or light-emitting diodes, also may be used for the display purposes contemplated by this invention.

Microprocessor 20 is further programmed to automatically initiate a "reset cycle" whenever the values in the "pieces to go" display and the "time to go" display both reach zero. At this point in the operation of apparatus 10, microprocessor 20 lights a "Reset Cycle" warning light 116 to confirm that reset has occurred, and substantially at the same time "toggles" the apparatus 10 into "pause" mode. To end the "pause" status that is activated by the occurrence of reset cycle conditions, dedicated "Reset Cycle" key 122 is actuated. Activation of this key extinguishes warning light 116 and reloads the previously entered "set point" value into the "pieces to go" register associated with "down" counter 30; if a new "set point" value is not entered using scroll keys 104 at this time, the last entered "set point" will be retained and reused, to assure that apparatus 10 does not begin operation with a zero value "set point".

A desirable feature of this invention includes the provision of a relay switch or relay-operated switch 125, shown in FIG. 1, coupled to the microprocessor that is capable of interrupting the supply of electrical power to a circuit to which the machine being monitored may be coupled. The relay may be controlled by the microprocessor to interrupt power to the external machine when the reset cycle is automatically initiated, as explained above. To provide further convenience in the use of the apparatus of this invention, relay 125 may be associated with a dedicated relay enable key 124 coupled to the microprocessor to allow the relay, by "toggle" action, to be "enabled", for automatic operation, or "disabled" so that it remains permanently "on" or "off" , depending upon the programming of the microprocessor, independently of control by the microprocessor. For still further convenience, an indicator light 126 may be controlled by the microprocessor to provide a visual indication of the state "enabled" or "disabled" of the relay 125.

It will be readily understood that this electronic apparatus depends upon the supply of electrical power thereto, and that such power may be derived preferably from an external power source of the type commonly available in residential and commercial buildings, or it may be made available in the form of a self-contained internal energy storage device such as a battery. Regardless of the source of electrical energy, a power supply switch 130 may be provided at any convenient location, as on housing 100, to control the supply of electrical power to the apparatus 10 and to thereby control when it is operable or inoperable..

Although a specific embodiment of this invention has been disclosed, it will be apparent to those having skill in this art that various other and further forms and embodiments may be visualized readily within the scope of this disclosure and the accompanying claims.

I claim:

1. An electronic apparatus for monitoring the operation of a cyclic machine, said apparatus comprising:

a sensor switch for providing a machine-related signal indicative of each successive cycle of a cyclic machine;

a first counter memory, a second counter memory and a third counter memory, each coupled to said microprocessor for receiving and storing machine-related signals from said microprocessor;

a random access memory device having having first second and third memory address locations corresponding to the said first, second and third counter memories;

a microprocessor having access to each of said first, second and third counter memories for storing signals therein and receiving signals therefrom representative of the count in each counter memory;

a timer connected to said microprocessor for providing elapsed time signals thereto;

a manually operable keypad coupled to said microprocessor for sending to said microprocessor signals selected by a human operator;

a display device coupled to said microprocessor for displaying indicia corresponding to signals provided by said microprocessor;

said microprocessor being programmed to perform the following functions:

a—receive signals corresponding to numerical values entered onto said keypad by an operator, store certain signals and numerical values selectively in said first second and third counter memories and produce indicia signals corresponding to those certain signals and numerical values for display by said display device; in response to a separate "enter" signal transmitted from said keypad;

b—receive machine generated signals from said sensor switch, through said microprocessor, representing sequential operations of a monitored machine and store a count number representing the total number of cycles of said machine in said first counter memory, and increase said count number by one for each successive received signal;

c—determine the elapsed time between the last two successive machine-generated signals from said sensor switch, store a signal representing said time and produce a corresponding "time per piece" indicia signal, for display by said display device;

d—determine the count number accumulated in said first counter, multiply said count number by the value of the said "time per piece" signal, and produce a corresponding "pieces to go" indicia signal for display by said display device;

e—produce an indicia signal corresponding to the value of the count recorded in said first counter for display by said display device as a "total count";

f—store a signal in said second counter representing the number of machine generated signals counted from said sensor switch since the time said second counter was last reset to zero;

g—produce an indicia signal corresponding to the value of the count recorded in said second counter for display by said display device as an "up count".

2. An electronic apparatus for monitoring the operation of a cyclic machine, in accordance with claim 1, said apparatus further comprising:

a relay switch coupled to said microprocessor for interrupting the supply of electrical power to an external circuit that can be coupled to an electrically powered machine.

3. An electronic apparatus for monitoring the operation of a cyclic machine, in accordance with claim 1, said apparatus further comprising:

a relay-enable key in said manually operable key pad coupled to said microprocessor for selectively enabling and disabling operation of said relay.

4. An electronic apparatus for monitoring the operation of a cyclic machine, in accordance with claim 1, said apparatus further comprising:

a relay-enabled indicator light coupled to said microprocessor for illumination when said relay is enabled by said microprocessor.

5. An electronic apparatus for monitoring the operation of a cyclic machine, in accordance with claim 1, wherein:

said display device includes a separate display location for each numerical value signal produced by said microprocessor corresponding to a discrete function of said microprocessor.

6. An electronic apparatus for monitoring the operation of a cyclic machine, in accordance with claim 1, said apparatus further comprising:

a power supply switch coupled to said apparatus for controlling the supply of electrical power thereto.

* * * * *